United States Patent [19]

Sands et al.

[11] Patent Number: 5,001,183

[45] Date of Patent: Mar. 19, 1991

[54] METHOD OF HYDROPHOBING SILICA

[75] Inventors: Bruce W. Sands, Columbus, Ga.; John C. Saam, Midland, Mich.

[73] Assignee: Dow Corning Corporation, Midland, Mich.

[21] Appl. No.: 531,376

[22] Filed: May 31, 1990

Related U.S. Application Data

[60] Division of Ser. No. 355,853, May 19, 1989, Pat. No. 4,950,502, which is a continuation-in-part of Ser. No. 94,970, Sep. 10, 1987, abandoned.

[51] Int. Cl.$^5$ ................................................ C08K 3/34
[52] U.S. Cl. .................................... 524/493; 524/588; 106/490; 428/404
[58] Field of Search ................. 524/493, 588; 428/404; 106/490

[56] References Cited

U.S. PATENT DOCUMENTS

| | | | |
|---|---|---|---|
| 4,504,621 | 3/1985 | Lefler, III | 524/588 |
| 4,954,565 | 9/1990 | Liles | 524/588 |
| 4,957,963 | 9/1990 | Burns et al. | 524/588 |
| 4,962,153 | 10/1990 | Liles | 524/588 |

*Primary Examiner*—Paul R. Michl
*Assistant Examiner*—K. Hellender
*Attorney, Agent, or Firm*—Edward C. Elliott

[57] ABSTRACT

A method of producing hydrophobic colloidal silica is disclosed. The method comprises combining an aqueous colloidal silica dispersion, polyorganosiloxane, and anionic surfactant to yield a stable aqueous emulsion of hydrophobic colloidal silica. The emulsion may be further processed by evaporating the water to yield a white material which may be easily ground to a fine powder of hydrophobic colloidal silica. This powder is useful as a reinforcement for silicone rubber.

4 Claims, No Drawings

METHOD OF HYDROPHOBING SILICA

This is a divisional of Ser. No. 07/355,853 filed May 19, 1989 now U.S. Pat. No. 4,950,502, which is a CIP of Ser. No. 07/094,970 filed Sept. 10, 1987 now abandoned.

BACKGROUND OF THE INVENTION

1. Field of the Invention

This invention relates to a process for producing hydrophobic colloidal silica.

2. Description of the Prior Art

Iler in U.S. Pat. No. 2,786,042, issued Mar. 19, 1957, described a process of adding an aqueous solution of a silanolate which is a strong alkali salt of a monovalent hydrocarbon-substituted silanol to an aqueous sol of colloidal particles of amorphous silica. These treated silica particles could be recovered by drying or they would be transferred from the original aquasol to an organosol by mixing the aquasol after treatment at a pH below 6 with an organic liquid and removing the water.

Another method of producing hydrophobic silicas was shown by Wetzel in U.S. Pat. No. 2,802,850, issued Aug. 13, 1957, wherein a lower alkyltrichlorosilane was hydrolysed in a water-in-oil emulsion containing an alkali-metal silicate. The treated silica was filtered from the oil, washed with water, and dried to yield the desired product. The treated silica is suitable for the preparation of greases and as fillers for elastomeric materials.

Youngs in U.S. Pat. No. 3,634,288, issued Jan. 11, 1972, prepared a hydrophobic silica sol by emulsifying a silica hydrosol in an oil dispersing medium, stripping water from the system, adding a silicone oil, and heating to allow the silicone oil to react with the silica-OH groups, resulting in an oil dispersion of the hydrophobic silica.

These processes yielded a dried, treated silica particle that was hydrophobic, or an organosol of the treated silica. The process of the instant invention provides a storage stable water emulsion of hydrophobic colloidal silica. This emulsion may be dried to yield a crusty, white material which may be easily ground to a fine fluffy white powder. The treated powder is hydrophobic and oleophilic.

Johnson et al. teach in U.S. Pat. No. 4,221,688, issued Sept. 9, 1980, a silicone emulsion which provides an elastomeric product. Their emulsion consists essentially of an anionically stabilized hydroxylated polydiorganosiloxane which contains about 2 silicon-bonded hydroxyls per molecule, an organic tin compound, and a colloidal silica, the emulsion having a pH in the range of 9 to 11.5 inclusive.

SUMMARY OF THE INVENTION

This invention comprises a method for making colloidal silica that is hydrophobic. The method consists essentially of combining an aqueous colloidal silica dispersion, and a hydroxyl containing, low molecular weight polyorganosiloxane in the form of an emulsion produced using an anionic surfactant such as dodecylbenzene sulfonic acid. After the emulsion mixture is homogeneous, its pH is adjusted to a range of 7.5 to 10 to provide a storage stable aqueous emulsion of hydrophobic colloidal silica.

The aqueous emulsion of hydrophobic colloidal silica may be dried to provide a solid hydrophobic silica which may be comminuted to form a fine powder which is not dispersible or soluble in water but is dispersible in toluene.

The powdered hydrophobic colloidal silica may be used as a reinforcement for silicone rubber. The aqueous emulsion of hydrophobic colloidal silica may be mixed with an emulsion of polydiorganosiloxane in emulsion form to yield a reinforced polymer when the water is removed from the emulsion.

DESCRIPTION OF THE INVENTION

This invention relates to a method for making colloidal silica hydrophobic consisting essentially of (I) combining to form an aqueous emulsion, (a) an anionic surfactant, (b) aqueous colloidal silica having primary silica particle diameters in the range of 2 to 100 nanometers and silica concentrations up to 65 percent based on the combined weight of silica and water, and (c) polyorganosiloxane having a average of from 3 to 40 siloxane units of the formula RR'SiO and an average of from 0 to 10 siloxane units of the formula $R_{4-x}Si$ where x has an average value greater than 2 with a maximum of 4 and each unsatisfied valence of silicon in the formula $R_{4-x}Si$ being satisfied with a hydroxyl radical or a divalent oxygen atom bonded to silicon atoms, the polyorganosiloxane being terminated by at least two hydroxyl radicals and the hydroxyl content not exceeding 15 weight percent based on the weight of the polyorganosiloxane, each R and R' in the polyorganosiloxane being selected from a monovalent radical of the group consisting of lower alkyl, aryl, alkenyl, aralkyl, and haloalkyl; the polyorganosiloxane being a liquid polymer or copolymer at processing temperature and having a weight average molecular weight of less than 4000, the ratio of silica to polyorganosiloxane being at least 2:1; and (II) adjusting the pH of the emulsion into the range of 7.0 to 10 to provide a storage stable aqueous emulsion of hydrophobic colloidal silica.

Colloidal sized particles of silica have been found useful as thickeners and as reinforcing filler in silicone rubber. When silicone rubber is reinforced with untreated silica, a reaction takes place that causes the mixture to become tough and nervy, making it difficult to further process the mixture unless such processing is done immediately after the mixture is made. It is known that such a reaction, known as structuring, or crepe aging, can be prevented by treating the surface of the silica with materials to react with the hydroxyl radicals present on the silica surface. Many methods have been devised for treating silica as a powder and as a water dispersion to prevent this undesired structuring. The instant invention is a simplified method of producing a treated silica particularly useful for reinforcing silicone rubber.

The colloidal silica used in the instant invention is commercially available. These aqueous silica sols, known as hydrosols, are dispersions of silica in water, having a pH of from about 8.2 to about 11.0, stabilized with sodium ions, aluminum ions, or ammonia. The primary silica particles can vary from 2 to 100 nanometers in average diameter with a preferable range of from 5 to 25 nanometers. The hydrosols can have up to 65 percent by weight silica with the usual range varying from 15 to 50 percent silica by weight.

The polyorganosiloxane useful in the instant invention is a low molecular weight hydroxyl containing polymer or copolymer which is liquid at processing temperature. The maximum weight average molecular weight of the polyorganosiloxane is less than 4000. The polyorganosiloxane has an average of from 3 to 40 siloxane units of the formula RR'SiO and an average of from 0 to 10 siloxane units of the formula $R_{4-x}Si$, the polyorganosiloxane being terminated by at least two hydroxyl radicals but the hydroxyl content not exceeding 15 percent based on the weight of the polyorganosiloxane. Each R and R' in the polyorganosiloxane are selected from a monovalent radical of the group consisting of lower alkyl, aryl, alkenyl, aralkyl, and haloalkyl. The polyorganosiloxane has R and R' selected such that the polyorganosiloxane is a liquid at processing temperature. If all of the organic radicals were phenyl for example, the polymer could be an intractable, solid crystaline material at processing temperature. Preferably, R and R' are methyl, ethyl, phenyl, vinyl, and 3,3,3,tri-fluoropropyl radicals with methyl being most preferred because it is readily available. The value of x has an average value of greater than 2 with a maximum of 4. Each unsatisfied valence of silicon in the formula $R_{4-x}Si$ is satisfied with a hydroxyl radical or a divalent oxygen atom bonded to a silicon atom. The preferred polyorganosiloxane is a hydroxyl endblocked polydimethylsiloxane having about 4 weight percent hydroxyl radical with a molecular weight in the range of 750 to 800.

An anionic surfactant is necessary to emulsify the polydiorganosiloxane. Anionic surfactants which are useful include salts of surface active sulfonic acids, alkali metal sulforicinates, sulfonated glycerylesters of fatty acids, salts of sulfonated monovalent alcohol esters, amides of amino sulfonic acid such as the sodium salt of oleyl methyl-tauride, sulfonated aromatic hydrocarbon salts such as sodium alpha-naptholene monosulphate, condensation products of naphthelene sulfonic acids with formaldehyde, and sulfates such as ammonium lauryl sulfate, triethanol amine lauryl sulfate, and sodium lauryl ether sulfate. The preferred anionic surfactants are the alkali metal salts of the sulfonic acids, particularly the sodium salts. The sulfonic acid can be illustrated by aliphatically substituted benzenesulfonic acids, aliphatically substituted naphthelene sulphonic acids, aliphatic sulfonic acids, silylalkylsulfonic acids, and aliphatically substituted diphenylether sulfonic acids. Particularly useful anionic surfactants are dodecylbensenesulfonic acid and the sodium salt of dodecylbenzenesulfonic acid.

The combining of the anionic surfactant, colloidal silica, and polyorganosiloxane can be performed in several ways. One useful method consists of adding the polyorganosiloxane to an aqueous colloidal silica dispersion along with the anionic surfactant, then stirring to obtain a homogeneous mixed emulsion. The emulsion is then adjusted with a 1 percent by weight hydrochloric acid solution to a pH above 7. The adjusted emulsion is storage stable. The hydrophobic silica may be used in the emulsified form or it may be dried by evaporating the water from it to yield a crusty material which is easily ground to a fine white powder which will not dissolve or disperse in water but easily dispersed in toluene.

A second useful method of combining the anionic surfactant, colloidal silica, and polyorganosiloxane involves the preparation of an emulsion of the polyorganosiloxane. The polyorganosiloxane, water, and anionic surfactant are mixed together, then homogenized by passing through a colloid mill or similar intense-type mixer. Three passes through a colloid mill at 316 kg per cm² gave a stable emulsion. In this case, the sodium salt of dodecylbenzene sulfonic acid was used as the anionic surfactant. The strongly basic colloidal silica dispersion is mixed with anionic surfactant and the pH is adjusted with dilute hydrochloric acid to a pH of just above 7. The emulsion of polyorganosiloxane is then slowly stirred into the colloidal silica emulsion. The homogeneous mixture then will yield a hydrophobic silica in the same manner as the first method.

A modified procedure may be used to yield a hydrophobic silica with improved reinforcing properties in silicone rubber by structuring a colloidal silica dispersion before treatment. An aqueous colloidal silica dispersion is stirred with a cation exchange resin to lower the pH to the acid side. Optimum results are obtained with a pH of about 5. The acidified colloidal silica is then aged while stirring. The structuring of the silica raises the viscosity of the dispersion and raises the pH. After the colloidal silica dispersion has structured, it is slowly added with stirring to a polyorganosiloxane emulsion prepared as discussed above in the second method. After mixing to give a homogeneous mixture, the pH is raised to between 7 and 10 with dilute sodium hydroxide and stirring continued. After a period, such as 1 hour, the viscosity will drop to yield an emulsion of hydrophobic colloidal silica similar to that prepared by the other methods except, when used to reinforce silicone rubber, this method will yield higher physical properties in the compounded and cured silicone rubber.

The amount of polyorganosiloxane used in the method of the instant invention is dependent upon the amount of colloidal silica in the emulsion. Useful products are obtained when the amount of polyorganosiloxane is below 50 percent by weight of the weight of colloidal silica present. When used as reinforcement in silicone rubber, the useful amount is between 6 and 35 percent. Below 6 percent, the amount of polyorganosiloxane is not sufficient to fully react with the silica surface so that when such a material is used to reinforce silicone rubber, the reinforced silicone rubber stock will become tough and nervy on storage. When above 35 percent of polyorganosiloxane is used, the hydrophobic colloidal silica, when mixed into silicone rubber, will yield a reinforced silicone rubber stock that will be sticky on the surface.

The amount of anionic surfactant used is based upon the amount of polyorganosiloxane used. There must be sufficient anionic surfactant present to emulsify the polyorganosiloxane used. When using the sodium salt of dodecylbenzene sulfonic acid, about 1 percent of the surfactant based on the weight of polyorganosiloxane is sufficient to emulsify the polyorganosiloxane. Higher levels of about 3 percent were found to yield higher physical properties in a silicone rubber compounded using the hydrophobic colloidal silica produced in this method. Amounts of surfactant in excess would adversely effect the properties of the finished articles produced using such a hydrophobic colloidal silica. The amount of surfactant based on the total solids in the emulsion can vary from 0.2 to 2 percent. Particularly useful emulsions are produced at about 1 percent surfactant based upon total solids in the emulsion.

The method of the instant invention yields a stable aqueous emulsion of hydrophobic colloidal silica when the pH of the final emulsion is between 7 and 10. This stable emulsion can be used in conjunction with emulsified silicone polymers to produce reinforced silicone bases suitable for compounding into silicone rubber stocks. The polymer emulsion and silica emulsion are mixed together, then allowed to age for a period of time, for instance from 1 to 4 days, to allow for any interaction between them. The mixed emulsion is then dried by evaporating the water bt air drying and vacuum drying at elevated temperature to yield a dry reinforced silicone rubber base. The base is then compounded on a 2 roll mill with an organic peroxide catalyst and any other desirable silicone rubber additives in the conventional, well-known manner.

The stable hydrophobic colloidal silica emulsion of the instant invention may also be used by evaporating the water from the emulsion by air drying or heating to yield a crusty, white material. This material is easily ground to a fine white powder. This powder is a hydrophobic silica which is suitable for the conventional uses of such materials. It may be used as reinforcement in conventional silicone rubber gum to produce a reinforced silicone rubber base that is not subject to the structuring on aging that is observed when untreated colloidal silica is mixed with a silicone rubber gum.

The following examples are presented for purposes of illustrating the invention and should not be construed as limiting the scope of the invention which is properly delineated in the claims.

EXAMPLE 1

This example illustrates one method of producing a hydrophobic silica.

A mixture of 200 g of a colloidal silica having 30 weight percent of $SiO_2$, pH of 9.7, and a particle size of 70 to 80 Angstrom and 20 g of a shortchain hydroxyl endblocked polydimethylsiloxane fluid having 3.9 weight percent hydroxyl radical was rapidly stirred for 16 hours at 23° C. The mixture was given 3 passes at 316 km/cm$^2$ through a homogenizer. No mixing or emulsification resulted; on standing the mixture separated into two phases. Then 0.704 g of dodecylbenzenesulfonic acid (DBSA) in 5 g of water (= ~1% by weight DBSA on solids) were added with simple stirring to achieve a homogeneous mixture. The emulsion was neutralized to a pH of 7.3 using 79 g of 1 percent by volume hydrochloric acid.

This emulsion remained stable for over 80 days.

When a portion of the above emulsion was dried, a crusty white powder remained which was easily ground to a fine white powder. This powder would not dissolve or disperse in water and greatly lowered the surface tension of the water. The powder was easily dispersed in toluene.

EXAMPLE 2

A second method of producing a hydrophobic silica is shown. A mixture of 60 g of the polydimethylsiloxane fluid of Example 1, 138 g of water, and 2.65 g of a 23% solution of a sodium salt of dodecylbenzenesulfonic acid was homogenized at 316 kg/cm$^2$ for 3 passes to give a stable mechanical emulsion (2.99% solids).

A mixture of 600 g of the colloidal silica of Example 1 and 1.8 g of dodecylbenzenesulfonic were mixed together, stirred well, and adjusted to a pH of 7.7 using 106 ml of 1.2 molar hydrochloric acid.

While stirring the silica emulsion, the polydimethylsiloxane emulsion was slowly added, then stirred for 1 hour. This mixed emulsion appeared similar to that of Example 1.

EXAMPLE 3

A third method of producing a hydrophobic silica is shown. This silica was modified to produce a more highly structured silica before being made hydrophobic.

The colloidal silica of Example 1 was treated with sufficient ion exchange resin to reduce the pH to 4.8. The silica was stirred in a closed system for 20 hours. Then 58 g of this aged acidic silica was added with stirring to 19.3 g of the polydimethylsiloxane emulsion of Example 2. After mixing, the pH was adjusted to 8.0 with a 2 percent by weight solution of sodium hydroxide. The silica emulsion was thick as it was added, causing the mixture of silica and polydimethylsiloxane to be thick. After stirring for an hour at the pH of 8, the mixture dropped in viscosity to a lower viscosity. The final emulsion was stable for at least 49 days.

When dried, the emulsion left a crusty white material which was easily ground to a fluffy white powder which floated on water but dispersed readily in toluene.

EXAMPLE 4

A series of compositions were prepared illustrating one method of using the hydrophobic silica of this invention.

A high molecular weight silicone polymer was prepared in an emulsion. A mixture of 1122 g of cyclodimethylsiloxanes having from 3 to 8 dimethylsiloxy units per molecule, 1.96 g of methylvinylcyclosiloxane, 1800 g of water, and 34.7 g of dodecylbenzenesulfonic acid were homogenized by passing 3 times through a homogenizer at 316 kg/cm$^2$. The emulsion was heated for 3 hours at 90° C. while stirring, then cooled to 2°–4° C. for about 4 days followed by adjusting to a pH of 7.5 using about 240 ml of a 2 percent solution of sodium hydroxide. The emulsion was 31.7% solids. A portion of the emulsion was coagulated and the polymer recovered. The polymer had a weight average molecular weight of 576,000 and a Williams Plasticity of 0.96 mm.

(A) A portion of this polymer emulsion was blended with untreated colloidal silica.

A mixture of 200 g of this polymer emulsion (63.4 g of polymer) was mixed with 63.3 g of the untreated colloidal silica of Example 1 (19.0 g of silica). This resulted in 30 parts of silica per 100 parts of polymer. After 24 hours at room temperature, the pH was adjusted from 9.9 to 7.5 by adding a 1 percent solution of acetic acid. The emulsion was poured into a large Teflon lined pan and placed in a hood for 48 hours to evaporate the water. The product was 84 g of an extremely brittle, waxy material. When it was attempted to mill a portion of the material, it could not be done; it merely ground to a finer powder.

(B) A portion of this polymer emulsion was blended with treated colloidal silica.

A mixture of 437 g of this polymer emulsion and 225 g of the colloidal silica emulsion of Example 1 after treating were shaken together and allowed to stand at room temperature for 4 days. This mixture was then coagulated by pouring in a dish, air drying at room temperature and vacuum oven drying at 80°–100° C. A 60 g portion of the dried polymer-silica mixture was milled together with 0.48 g of 2-5 bis (tertbutylperoxy)-2,5-dimethylhexane catalyst at 50% active material to yield a catalysed material. This was pressed into a sheet and cured 10 minutes at 171° C. The cured sheet was cut into specified test bars and tested according to ASTM D 2240 for durometer and ASTM D 412 for tensile strength and ultimate elongation. The results were as shown in Table I.

(C) A portion of the polymer emulsion was cured without the silica reinforcement.

The material and procedure of 4B was repeated, but the colloidal silica emulsion was not added to the polymer emulsion.

The results were as shown in Table I.

(D) A portion of the polymer emulsion was blended with the structured hydrophobic silica.

A mixture of 170 g of this polymer emulsion and 72 g of the structured hydrophobic silica emulsion of Example 3 were stirred together for 24 hours at room temperature. The mixture was coagulated by pouring in a dish, air drying at room temperature and vacuum oven drying at 100° C. for 2 hours. The dried mixture was catalyzed, molded, and tested as in Example 4B. The results were as shown in Table I.

TABLE I

| Sample | Durometer | Tensile Strength | Elongation |
|---|---|---|---|
| 4A | no usable product | MPA | Percent |
| 4B | 22 | 1.96 | 770 |
| 4C | 11 | 0.21 | 177 |
| 4D | 26 | 5.12 | 743 |

This example illustrates the usefulness of the treated silica in reinforcing a silicone polymer.

That which is claimed is:

1. A storage stable aqueous emulsion of hydrophobic colloidal silica produced by a method consisting essentially of
   (I) combining to form an aqueous emulsion,
   (a) an anionic surfactant,
   (b) aqueous colloidal silica having primary silica particle diameters in the range of 2 to 100 nanometers and silica concentrations up to 65 percent based on the combined weight of silica and water, the aqueous colloidal silica having first been structured by aging at pH of 4 to 5 before combining with (a) and (c), and
   (c) polyorganosiloxane having an average of from 3 to 40 siloxane units of the formula RR'SiO and an average of from 0 to 10 siloxane units of the formula $R_{4-x}Si$ where x has an average value greater than 2 with a maximum of 4 and each unsatisfied valence of silicon in the formula $R_{4-x}Si$ being satisfied with a hydroxyl radical or a divalent oxygen atom bonded to silicon atoms, the polyorganosiloxane being terminated by at least two hydroxyl radicals and the hydroxyl content not exceeding 15 weight percent based on the weight of the polyorganosiloxane, each R and R' in the polyorganosiloxane being selected from a monovalent radical of the group consisting of lower alkyl, aryl, alkenyl, aralkyl, and haloalkyl; the ratio of silica to polyorganosiloxane being at least 2:1 and
   (II) adjusting the pH of the emulsion into the range of 7.0 to 10
   to provide a storage stable aqueous emulsion of hydrophobic colloidal silica.

2. A solid, hydrophobic silica produced by a method consisting essentially of
   (I) combining to form an aqueous emulsion,
   (a) an anionic surfactant,
   (b) aqueous colloidal silica having primary silica particule diameters in the range of 2 to 100 nanometers and silica concentrations up to 65 percent based on the combined weight of silica and water, and
   (c) polyorganosiloxane having an average of from 3 to 40 siloxane units of the formula RR'SiO and an average of from 0 to 10 siloxane units of the formula $R_{4-x}Si$ where x has an average value greater than 2 with a maximum of 4 and each unsatisfied valence of silicon in the formula $R_{4-x}Si$ being satisfied with a hydroxyl radical or a divalent oxygen atom bonded to silicon atoms, the polyorganosiloxane being terminated by at least two hydroxyl radicals and the hydroxyl content not exceeding 15 weight percent based on the weight of the polyorganosiloxane, each R and R' in the polyorganosiloxane being selected from a monovalent radical of the group consisting of lower alkyl, aryl, alkenyl, aralkyl, and haloalkyl; the ratio of silica to polyorganosiloxane being at least 2:1 and
   (II) adjusting the pH of the emulsion into the range of 7.0 to 10 to provide a storage stable aqueous emulsion of hydrophobic colloidal silica, then
   (III) evaporating the water from the emulsion to provide a solid hydrophobic silica which is comminuted to form a fine powder which is not dispersible or soluble in water but is dispersible in toluene.

3. A method of producing a reinforced silicone base suitable for compounding into silicone rubber stocks comprising mixing an anionic emulsion of a high molecular weight polydiorganosiloxane with the aqueous emulsion of hydrophobic colloidal silica produced by a method consisting essentially of
   (I) combining to form an aqueous emulsion,
   (a) an anionic surfactant,
   (b) aqueous colloidal silica having primary silica particle diameters in the range of 2 to 100 nanometers and silica concentrations up to 65 percent based on the combined weight of silica and water, and
   (c) polyorganosiloxane having an average of from 3 to 40 siloxane units of the formula RR'SiO and an average of from 0 to 10 siloxane units of the formula $R_{4-x}Si$ where x has an average value greater than 2 with a maximum of 4 and each unsatisfied valence of silicon in the formula $R_{4-x}Si$ being satisfied with a hydroxyl radical or a divalent oxygen atom bonded to silicon atoms, the polyorganosiloxane being terminated by at least two hydroxyl radicals and the hydroxyl content not exceeding 15 weight percent based on the weight of the polyorganosiloxane, each R and R' in the polyorganosiloxane being selected from a monvalent radical of the group consisting of lower alkyl, aryl, alkenyl, aralky, and haloalkyl; the polydiorganosiloxane being a liquid polymer or copolymer at processing temperature and having a weight average molecular weight of less than 4000, the ratio of silica to polyorganosiloxane being at least 2:1 and
   (II) adjusting the pH of the emulsion into the range of 7.0 to 10 to provide a storage stable aqueous emulsion of hydrophobic colloidal silica, then
   (III) evaporating the water from the emulsion to provide a solid hydrophobic silica which is comminuted to form a fine powder which is not dispersible or soluble in water but is dispersible in toluene, aging the mixture to allow any interaction between them, then removing the water to give a reinforced silicone rubber base.

4. A reinforced polyorganosiloxane containing hydrophobic silica produced by a method consisting essentially of
(I) combining to form an aqueous emulsion,
  (a) an anionic surfactant,
  (b) aqueous colloidal silica having primary silica particle diameters in the range of 2 to 100 nanometers and silica concentrations up to 65 percent based on the combined weight of silica and water, and
  (c) polyorganosiloxane having an average of from 3 to 40 siloxane units of the formula RR'SiO and an average of from 0 to 10 siloxane units of the formula $R_{4-x}Si$ where x has an average value greater than 2 with a maximum of 4 and each unsatisfied valence of silicon in the formula $R_{4-x}Si$ being satisfied with a hydroxyl radical or a divalent oxygen atom bonded to silicon atoms, the polyorganosiloxane being terminated by at least two hydroxyl radicals and the hydroxyl content not exceeding 15 weight percent based on the weight of the polyorganosiloxane, each R and R' in the polyorganosiloxane being selected from a monovalent radical of the group consisting of lower alkyl, aryl, alkenyl, aralky, and haloalkyl; the polydiorganosiloxane being a liquid polymer or copolymer at processing temperature and having a weight average molecular weight of less than 4000, the ratio of silica to polyorganosiloxane being at least 2:1 and
(II) adjusting the pH of the emulsion into the range of 7.0 to 10 to provide a storage stable aqueous emulsion of hydrophobic colloidal silica, then
(III) evaporating the water from the emulsion to provide a solid hydrophobic silica which is comminuted to form a fine powder which is not dispersible or soluble in water but is dispersible in toluene.

* * * * *